Nov. 23, 1943.  J. M. PEARSON  2,335,024

METHOD AND APPARATUS FOR MAKING CORROSION STUDIES

Filed Jan. 1, 1943  2 Sheets-Sheet 1

WITNESS:

INVENTOR
John M. Pearson
BY
ATTORNEYS.

Patented Nov. 23, 1943

2,335,024

UNITED STATES PATENT OFFICE 2,335,024

METHOD AND APPARATUS FOR MAKING CORROSION STUDIES

John M. Pearson, Swarthmore, Pa., assignor to Sun Oil Company, Philadelphia, Pa., a corporation of New Jersey Application January 1, 1943, Serial No. 470,988

23 Claims. (Cl. 175—183)

This invention relates to a method and apparatus for making studies of corrosion conditions of underground structures such as pipe lines or the like.

The corrosion of an underground structure such as a pipe line is fundamentally an electrolytic phenomenon involving in general two types of electrolytic action superimposed upon each other. First, there is that action which results from currents taking flow paths which have dimensions of the order of those involved in the structure or larger. These currents are, for example, earth currents produced by reason of the presence of power lines, electric traction systems, or the like. The other action results from currents produced by local differences in the composition, surface conditions or surroundings of relatively close portions of the metallic structure, these currents being generally known as local action currents. Measurements of the so-called external currents of the first type are commonly made and are very useful in giving information by which proper precautions may be indicated for avoidance of corrosion. Measurements of this type, and adjustments of conditions depending thereon, can be made, for example, in accordance with the disclosures of my Patents Nos. 2,086,737, 2,103,636, 2,123,545 and 2,160,671.

The present invention is primarily concerned with methods and apparatus for the measurement of conditions giving rise to local action currents, and in particular relates to the making of such measurements independently of the simultaneous flow of external currents. These and other objects of the invention will become apparent from the following description, read in conjunction with the accompanying drawings, in which.

Figure 1:
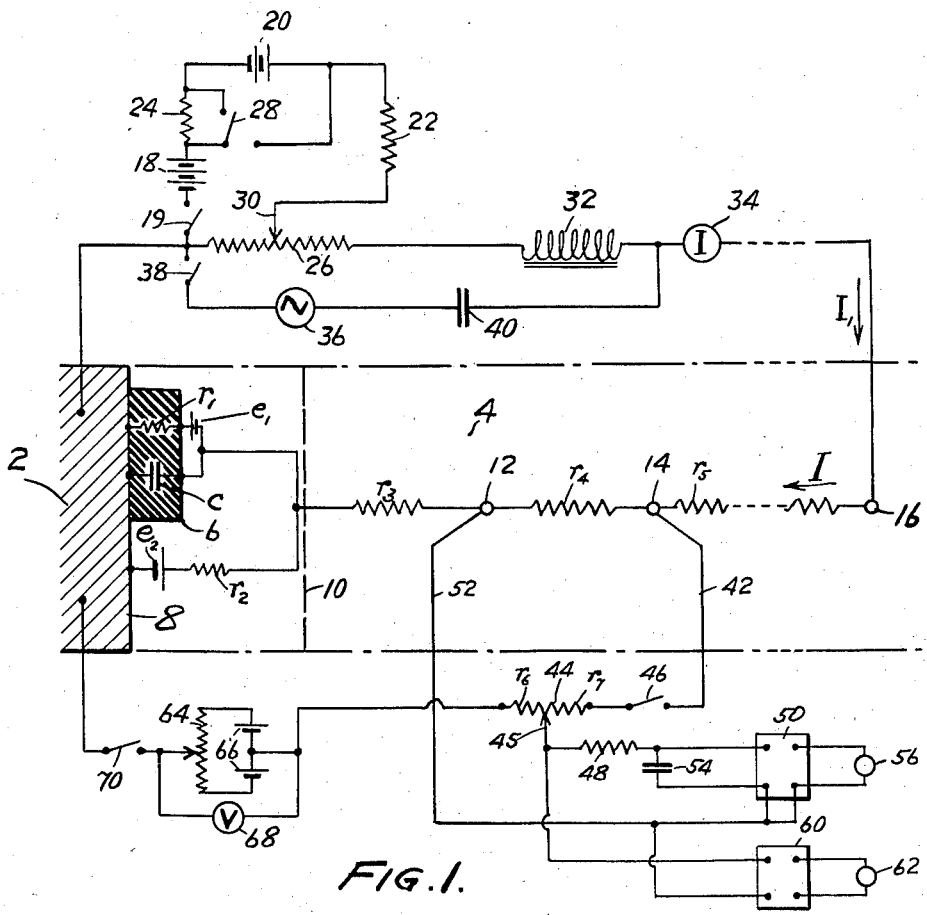
Figure 1 is a diagram showing the physical layout of a measuring apparatus provided in accordance with the invention and indicating certain fictitious resistances and other electrical parameters associated with an electrode the corrosion activity at which is being measured.

The surface of a conductor subject to local corrosion is made up of elementary areas at which there exist different potentials and different resistances. Considering an imaginary tube based on each such elementary unit area $ds$ and bounded by lines of flow of external currents (i. e., currents flowing from substantial distances to or from the conductor), if $e_s$ is the potential existing at the electrode surface, $\rho(x)$ is the specific resistivity at each point along the tube (including a possibly very high specific resistivity at the surface of the conductor) which specific resistivity may vary with $x$, the distance therealong, $A(x)$ is the ratio of the cross-section of the tube at each point $x$ to the cross-section $ds$, $I$ is the external current per unit area (constant along the tube) and $i(x)$ is the local current per unit area, variable along the tube since such current flows between adjacent tubes thereby finding its way from regions of high $e_s$ to those of low $e_s$, the value of $e_x$ at any point along the tube is given by:

$$e_x = e_s + \int_0^x \frac{\rho(x)}{A(x)}[I + i(x)]dx$$

$$= e_s + \int_0^x \frac{\rho(x)}{A(x)} i(x)dx + I \int_0^x \frac{\rho(x)}{A(x)} dx$$

(Currents considered flowing to the conductor.)

Without here proving the same, it will be intuitively seen that at a relatively short distance from the conductor surface, of the order of several times the spacing of any large areas of substantial differences in surface conditions, there may be drawn a surface more or less normal to such tubes at which the effects of the first two terms given above will have become so smoothed out over a finite area of such surface that thereat there will appear a potential varying only gradually and smoothly from point to point, with the corollary that there may be drawn beyond such region equipotential surfaces which, with increasing distance from the conductor will be normal to the flow lines of external current. Likewise, between any unit area of such equipotential surface and the conductor, the last integral will represent an effective resistance varying only slowly from point to point along such surface. It may be further noted that at any substantial distance from the conductor the change in this effective resistance with distance is small, i. e., the effective resistance is to a major extent concentrated in the vicinity of the conductor surface, the more so as the configuration is such as to provide a converging field thereat.

It will be evident that both the potential existing at the equipotential surface and the last mentioned resistance per unit area between the equipotential surface and the conductor, representing, essentially, local conditions, have a significance intimately tied up with the surface conditions at the conductor, since they are integrated residues of the various terms of the above equation, related to finite rather than differential areas of the conductor. The potential is, in effect, an average surface potential, $e$, differing from the theoretical potential of the clean metal of the electrode with respect to the surrounding electrolyte to a degree dependent upon the intensity of the local action currents, less an $rI$ drop due to external currents through the effective resistance, while the resistance, $r$, takes into account local surface conditions representing, largely, the resistances due to oxide or other accumulations at the electrode surface, these being generally high as compared with resistances existing through the electrolyte, i. e., the principal values of $\rho(x)$ which are of significance are found at the conductor surface.

Thus it becomes valid to say that at some surface, moderately spaced from a buried conductor, there appears a potential equal to $e+rI$, $I$ being the external current flowing through the surface and $r$ being some resistance measured in terms of unit area of the surface, unit area or projected area of the conductor, or, most conveniently, in the case of an elongated conductor such as a pipe line, unit length thereof.

As noted above, and as found from experiment, the major resistance is found at the surface of the conductor due to film or scale. While this leads to a relatively high resistance to direct current, the same cause leads to a low impedance to alternating current since the thin films over large areas provide, in effect, large capacity condensers shunting the resistances of their own dielectrics. As will be clear hereafter, advantage is taken of this to secure measurements using alternating currents.

Referring first to Figure 1, there is indicated at 2 a portion of the surface of a conductor at which local corrosion is taking place, this conductor being in contact with an electrolyte indicated as located in the region 4, which may be regarded as having a unit extent either in cross-sectional area at the conductor or per unit length of an elongated conductor and bounded by flow lines of external current. To preserve the picture given above and to conform with the usual conventionalized view of what occurs at the surface of a corroding conductor, there is shown within the surface contacting the electrolyte region under consideration a film 6 of high resistivity on a portion of the surface of the conductor and a relatively low resistance region of relatively clean conductor surface indicated at 8. Associated with the region 6 there may be considered to be a resistance $r_1$ shunted by a capacity $C$, together with a potential arising in the region covered by the film 6 equal to $e_1$. In the region 8, similarly, a resistance $r_2$ may appear and a potential $e_2$. If any real meaning is to be given to these quantities, it will be evident that it would be represented by an integration of the microscopic conditions referred to above over a finite area of resistance above a certain value and a similar integration over a finite area of resistance below that value. Whether regarded in this conventionalized fashion or from the more elaborate standpoint heretofore set forth, there will, nevertheless, be at some particular distance an imaginary boundary surface indicated at 10 which will be, within the bounds of the region considered, an equipotential surface of the character mentioned above, at and beyond which the local action conditions have no effect in producing large point to point variations of either potential or apparent resistivity. Between this surface and the conductor, therefore, there may be considered as existing a potential $e$, an effective resistance $r$ and a shunting capacity $C$ per unit area, or length, which capacity is sufficiently large to form an effective by-pass of the resistance for alternating currents of high enough frequency. The invention is essentially concerned with the evaluation of $e$ and of the resistivity $r$, the latter at least in a comparative sense, for various regions along the conductor.

Within the range beyond the boundary surface 10, there are located two half cells 12 and 14 of the conventional non-polarizable type used in earth measurements having a salt solution bridge to the earth, and also a remote electrode 16 which may be a ground stake or the like. Carrying out the idea of having an electrolyte region extending normally from a unit region of the conductor, there may be regarded as existing between the surface 10 and the half cell 12 a resistance $r_3$, between the two half cells 12 and 14, a resistance $r_4$, and between half cell 14 and the remote electrode 16 a resistance $r_5$. As will be evident hereafter, all that need be considered are effective resistances, and for purpose of insight into what is involved they may be regarded as linear rather than as distributed in three dimensions.

A detecting apparatus is connected to the half cells at 12 and 14. To the electrode or half cell 14 is connected, through conductor 42 and switch 46, a potentiometer resistance 44, which is connected in turn through a voltmeter 68 and switch 70 to the conductor 2 under investigation. The voltmeter 68 is shunted by a potential applying system consisting of suitably arranged batteries 66 and a potentiometer 64. The parallel combination of 64 and 68 should have a low resistance compared to 44 so that adjustment of 64 will have a minimum effect on the balance of 44. This arrangement is provided for providing suitable balancing or backing out potentials in making the measurements.

The slider 45 of the potentiometer 44 is connected to the input of a vacuum tube voltmeter responsive to direct current through a filtering system consisting of a resistance 48 and a condenser 54, shunting the meter, the other side of the voltmeter being connected to the half cell 12, through connection 52. Also connected between the potentiometer slider 45 and the half cell 12 is a vacuum tube voltmeter indicated at 60 capable of responding to alternating potentials, but not responsive to direct potentials. At 56 and 62 are respectively shown meters for indicating the input voltages of the vacuum tube meters 50 and 60, the details of which will be indicated hereafter in connection with the descriptions of Figures 2 and 3.

For the purpose of providing variable current input to the system, there is furnished a battery 18, together with a smaller battery 20, there being located between these batteries a battery protecting resistance 24, which in one position of the single-pole double-throw switch 28 may be short circuited, while in the other position thereof it prevents short circuiting of the battery 20 when the positive side of the battery 18 is directly connected to a resistor 22 joined to the slider 30 of a potentiometer 26. The resistor of the latter is connected at one end to the conductor 2 to which the battery 18 may also be connected through the switch 19. A supply of alternating current, which may take the form of a small alternator 36, is arranged to be connected to the conductor 2 through the switch 38, and is capable of delivering an alternating current through condenser 40 and direct current meter 34 to the remote electrode 16. A choke 32 is provided to keep the alternating current out of the batteries 18 and 20, at the same time furnishing a low resistance path for direct currents which are kept out of the alternator by the condenser 40.

Figure 2:
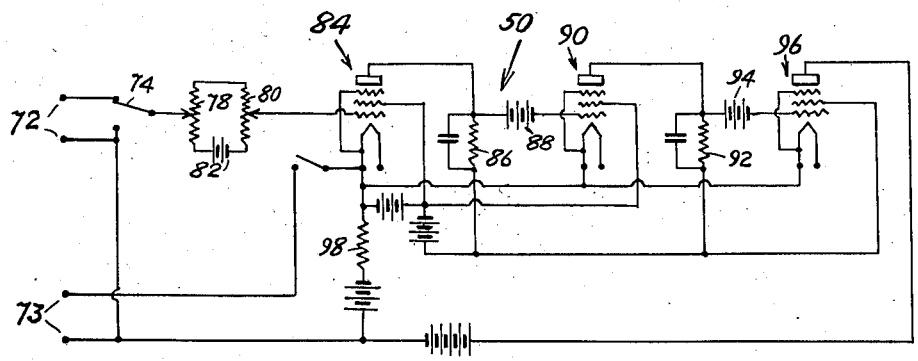
Figure 2 is a wiring diagram illustrating the details of a direct current meter which is diagrammatically indicated in Figure 1.
Figure 3:
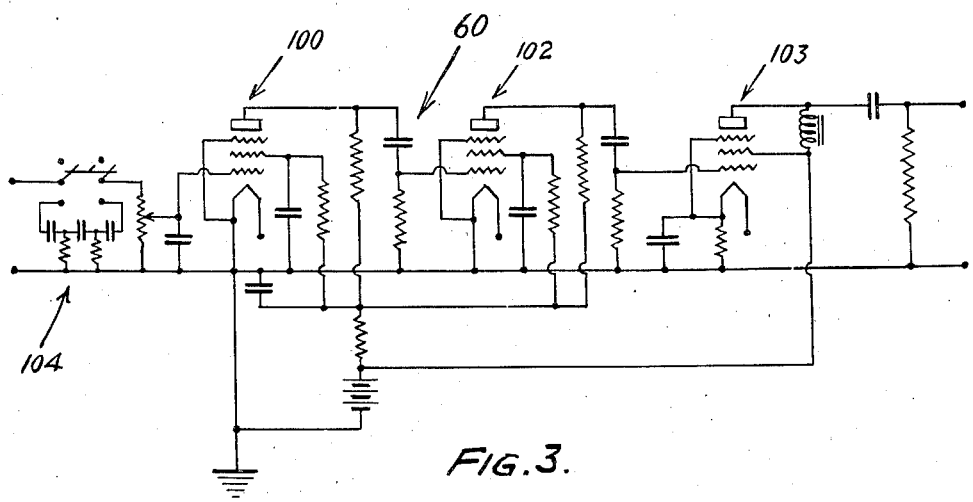
Figure 3 is a similar diagram showing an alternating current meter diagrammatically indicated in Figure 1.

Before proceeding with a description of the operation of the circuit, reference may be made to Figures 2 and 3, showing preferred sensitive vacuum tube voltmeters diagrammed in Figure 1. The details of the D. C. voltmeter 50 are indicated in Figure 2, wherein the input terminals are illustrated at 72, and the output terminals at 73, these latter being connected to a suitable D. C. meter, such as 56 of Figure 1. One of the terminals 72 is arranged to be connected through a switch 74 to a bias supplying system consisting of a pair of potentiometers 78 and 80 connected as shown across a battery 82 with the slider of the potentiometer 80 connected to the control grid of a first stage tube 84. The output of this tube produces a potential across the resistor 86 which is reduced to a predetermined fixed extent by the battery 88 for application to the control grid of a second stage tube 90. The output voltage of this tube appears across a resistor 92 and is applied to the control grid of a third tube 96 through a battery 94, bringing it down to a suitable value. By reason of the presence of a resistor 98 in the return circuit from the plate of the tube 96, the vacuum tube voltmeter is of an inverse feed-back type of such nature that the meter 56 may be calibrated directly in the direct millivolts appearing at the input, none of the meter current flowing in the observing circuit. This circuit does not form a part of the invention, and is substantially conventional, the description thereof being given solely to indicate the fashion in which readings are made directly and to a high degree of sensitivity without providing any disturbing current flow in the bridge system due to the action of the meter circuit.

Figure 3 illustrates the A. C. vacuum tube amplifier responding to A. C., to the exclusion of D. C. This, as will be evident from the diagram, is essentially merely a resistance coupled A. C. amplifier comprising the tubes 100, 102 and 103, with conventional interstage coupling, and with provision of a filter system 104 at the input for the purpose of excluding direct voltages and for suppressing low frequency alternating voltages, the condensers of the filter being of low capacity. The meter 62 (Figure 1) to which the output of this amplifier is delivered is of a type responsive to alternating current.

Figure 4:
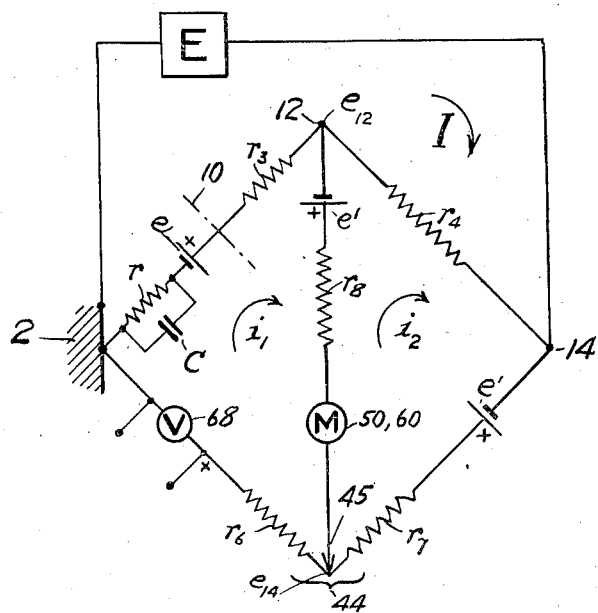
Figure 4 is a diagram in which the electrical configuration of Figure 1 is shown in a conventionalized, simplified form as corresponding to a Wheatstone bridge from which the significance of the steps involved may be understood.

In order to make clear the significance of the manipulations hereafter described, there may first be analyzed with reference to Figure 4 the circuit illustrated in Figure 1, with the various elements taken in arbitrary, unbalanced condition. As will be evident from comparison of Figures 1 and 4, the former constitutes essentially a Wheatstone bridge arrangement in which, by reason of a source E connected to the conductor 2 and the position of the half cell at 14, an exciting current I having alternating and direct components is introduced to the bridge, the current I entering the bridge being actually this plus the earth current flowing to the conductor past electrode 16. The several resistances $r_3$ and $r_4$ are illustrated as within branches of the bridge, while $r_6$ and $r_7$ are the respective resistances of the potentiometer 44 on opposite sides of the slider 45. The half cells at 12 and 14 may be assumed to have equal potentials indicated at $e'$. The resistance of the circuit to the meters from the point 12 is indicated at $r_8$, the combination of the meters 56 and 62 being indicated as a single meter M. The fictitious potential $e$, resistance $r$ and capacity C between conductor 2 and the boundary 10 are indicated in Figure 4, as well as the voltmeter 68 which, from the electrical standpoint, may be regarded as the source of a potential V, which is actually applied across it by the battery-potentiometer system, the resistance of the voltmeter system forming a part of $r_6$. For convenience in analysis, the potential at the point 12 is indicated as $e_{12}$ and that at the slider 45 as $e_{14}$ referred to electrode 2 as zero. Mesh currents are indicated at $i_1$ and $i_2$. It will be evident that, considering the lower and upper branches of the Wheatstone bridge, and assuming condenser C to be of such capacity as to furnish a short circuit for alternating current, then for both alternating and direct currents the following are true:

(1) $\quad E = -e' + r_7 i_2 + V + r_6 i_1$ (2) $\quad E = +e + r_4(I - i_2) + (r + r_3)(I - i_1)$ For the alternating component, of course, $r$ becomes zero as pointed out hereafter in view of the short circuiting action of the condenser C.

Considering potentials at $e_{12}$ and $e_{14}$, it will be evident that the following relationships are correct:

(3) $\quad e_{12} = E + r_4(i_2 - I)$ (4) $\quad e_{14} = E + e' - r_7 i_2$ (5) $\quad e_{12} - e_{14} + e' = r_8(i_1 - i_2)$ By the elimination of E, $e_{12}$ and $e_{14}$ from the above, the following equations involving $i_1$ and $i_2$ are obtained:

(6) $\quad i_1(r + r_3 + r_6) + i_2(r_4 + r_7) = e + e' - V + I(r + r_3 + r_4)$ (7) $\quad i_1(-r_8) + i_2(r_4 + r_7 + r_8) = r_4 I$ from which the current through the meter $I_M$ is obtained as follows:

(8) $\quad I_M = i_1 - i_2 = \dfrac{(r_4 + r_7)(e + e' - V) + I\{r_7(r + r_3) - r_4 r_6\}}{D}$ In the above result, D indicates the determinant involving the various resistances. Since, as will appear hereafter, the results obtained are independent of the value of this determinant, it need not be evaluated. Since $r_6 + r_7$ is considerably larger than $r$, $r_3$ and $r_4$, and $r_8$ is very high, it is approximately equal to $r_8(r_6 + r_7)$.

The above Equation 8 is general and applies to both direct and (with $r = 0$) alternating currents for a general unbalanced state of the circuit. From this general result there may be considered the effects and significance of the various manipulations to secure the desired information.

First, with switch 19 closed, adjustment is made at 64 to set the reading of M on scale. Then, while alternately shifting switch 28 between its two positions, slider 45 is adjusted so that the variation of the current $I_1$ no longer varies the reading of the D. C. meter M. Under such conditions, it will be obvious that the coefficient of I in Equation 8 must be zero. Therefore, when V is adjusted to secure a zero reading on meter M, there will hold exactly the relationship (9) $$V = e + e'$$

from which $e$ may be calculated, inasmuch as $e'$ is known from the nature of the half cells and V is readable on 68.

It will be noted that the above procedure involves two null adjustments. The first adjustment, which makes the coefficient of I zero by adjustment of slider 45 has an effect on the sensitivity with which meter M responds to adjustments of slider 64. If $r_4$ and therefore $r_7$ are both small, the sensitivity of M to changes in V is much reduced so that it is desirable so to locate the electrodes 12 and 14 that the ratio of $r_4$ to $r_3$ is as high as possible.

If the variation of $I_1$ in making the foregoing adjustment is of the order of 10%, for example, if the voltage of cells 20 is about 10% of that of cells 18, there will be no substantial change of $e$ with the current flowing through the region 4 since, while the potential $e$ varies with I, it is only a slowly varying function thereof. It is of importance to find the variation of $e$ with I, however, and to this end, with slider 45 in the adjusted position to make the coefficient of I in Equation 8 zero, the value of $I_1$ may be very substantially varied and with each variation the circuit may be adjusted at 64 to secure zero reading of meter M. The value of V at each balance will then give the variation of $e$ with changes in $I_1$ (i. e. I) which may be plotted.

This assumes constant the component of I due to earth currents. While this over a short period of time will usually be the case, the actual value of I may be measured throughout the experiment by the use of the earth current meter of Patent 2,123,545 within the region 4. In this way also, the linear relationship of $I_1$ to the current produced according to a particular convention characterized by the earth current meter may be ascertained; in other words, a quantitative type of result in definite units may be secured as compared with the comparative results heretofore referred to and which, generally speaking, are all that is required. By the comparison of earth current meter readings with those of current through meter 34, the current flowing through 34 may be multiplied by an ascertained factor to give actual current per unit length of a pipe line or the like.

Reference has been made to the inverse feedback nature of the meter circuit of Figure 2. This is of considerable importance in securing direct readings without requiring manipulations of the slider at 64. As will be evident from Equation 8, the current introduced into meter M (i. e., the quotient of the voltage by the input resistance of the circuit of Figure 2 at terminal 72) is linearly related to the voltage $e$, and since the output current through meter 56 is, by the nature of the circuit of Figure 2, proportional to its input current, meter 56 will give readings linearly related to $e$. If, therefore, slider 45 is so adjusted, as before, that the coefficient of I is zero, it will be evident that the readings of meter 56 may give directly the values of $e$ varying with I, calibration being accomplished by variation of readings of V by adjustment at 64, the adjustment at 64 thereafter remaining constant during the making of any set of readings of meter 56 against those of meter 34. This depends, of course, on constancy of $r$ (Equation 8). Practically this is the case for the duration of a short period test. If observations indicate that this condition is not approximately satisfied, measurements should be made by the null method heretofore described for each observation.

In line with the above, by any of the several methods set out, there may be secured the variation of $e$ with earth current entering the line, which earth current itself may vary with time as may be ascertained by the use of the earth current meter of Patent 2,123,545.

To obtain the value of $r$, alternating current is applied by closing switch 38 with switch 19 remaining closed, and the slider 45 is adjusted so that M (now the A. C. meter 60, 62) reads zero. Since $r$ is now shunted by capacity C, it is effectively zero so that, at balance, the direct voltages $e$, $e'$ and V not affecting the meter, $r_7 r_3 - r_4 r_6 = 0$.

Accordingly, maintaining this adjustment of the slider 45, the D. C. meter 56 reads, $$I_M = \left(\frac{r_4 + r_7}{D}\right) \cdot (e + e' - V + rI)$$

This may be written $$e + e' - V + rI = KI_M$$

Differentiating $$de - dV + r\,dI = K\,dI_M$$

or $$\frac{de}{dI} + r = \frac{dV}{dI} + K\frac{dI_M}{dI}$$

If, therefore, I is varied by a small amount (10%) and V is changed to bring $I_M$ to the same reading as before, so that the last incremental term is zero, $$r = \frac{dV}{dI} - \frac{de}{dI}$$

of which $dV$ and $dI$, as well as the relatively slight, and usually negligible, ratio $$\frac{de}{dI}$$

are known. Thus $r$ is evaluated for the same unit as that for which I is measured, for example, per unit length, I being, of course, translated into earth current values for quantitative results.

In this case, also, it will be evident that the calibrated readings of the meter M with V held constant can be observed to obtain the value of $r$.

The ultimate results of the above are twofold: first the plotting of $e$ against I for any given location along the conductor, and second the evaluation of $r$ for any particular location. In the case of a coated pipe line the value of $r$ may be determined by a coating applied to the pipe line and its usefulness for cathodic protection may be evaluated, since bare or poorly coated spots may be located.

Certain precautions, which, however, are not particular restrictive, must be taken into account in carrying out the different procedures. The nearest electrode 12 should be located outside the boundary 10 of the character indicated above. This calls merely for its location at a moderate distance from the electrode 2, for example of the order of more than five pipe diameters in the case of a pipe line. Likewise, the spacing between electrodes 12 and 14 is determined by local conditions, it being desirable to move it to a point of maximum potential difference so long as it is within the field of current flow from the pipeline. Locating it at a point of high potential permits balance of bridge 44 at minimum values of $r_6$ and maximum values of $r_7$. Since the latter shunts the null indicator M, this condition is one of maximum sensitivity to changes in V. The fact that these electrodes are properly located may be indicated quite readily by opening the switch 70 and noting whether the D. C. meter indicates a difference of potential between the electrodes in the absence of an external current occurring either naturally or by the application of a sufficiently large bucking current from the D. C. source to reduce the current in this region to a value of zero.

The frequency of the alternating current applied from a generator 36 must be sufficiently high that the capacity effect substantially completely bypasses the resistivity offered to direct current by high resistance scale or the like. Generally, a frequency of 1,000 cycles will suffice, though the sufficiency of the value of the frequency may be readily determined by increasing the frequency and noting whether the impedance is substantially reduced by such increase.

The amplitude of the alternating current introduced must also be held within limits to avoid effects due to rectification. This may be ascertained by noting whether the application of alternating current makes any change in the reading of the D. C. meter. No change should appear if the value is sufficiently low to avoid rectification.

The D. C. currents used must not be too high as to polarize the half cells. The limiting values may be readily ascertained from consideration of the known properties of the half cells.

The electrodes 12 and 14 need not be aligned with the flow of current, as will be evident from the above discussion, though approximate alignment is desirable. The reason is that the variation of current flow along the conductor as a whole if, for example, it is a pipe line, is relatively slow with respect to distance along the line. It will be noted that the resistance $r_4$ does not enter into the final pictures, and hence the precise resistance between the electrodes 12 and 14 is immaterial.

In the above discussion, equality of the potentials of the half cells at 12 and 14 has been assumed. Even if this is not strictly true, the results are substantially correct, and the small differences of potential which may exist have no effects of moment if, as is generally true, relative results are the only ones which are of interest. For a more complete discussion of theoretical details, and in particular of the obtaining of quantitative results of theoretical considerations, reference may be made to the article by applicant entitled "'Null' methods applied to corrosion measurements," appearing in the Transactions of the Electrochemical Society, volume 81, page 485.

What I claim and desire to protect by Letters Patent is:

1. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, varying current flowing between the conductor and a point beyond the more remote electrode and adjusting said variable point so that the meter is substantially non-responsive to such current variations, adjusting said variable source of potential to secure substantially zero reading of said meter, and noting the value of the potential of said variable source.

2. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, adjusting said variable source of potential to secure substantially zero reading of said meter, and noting the value of the potential of said variable source.

3. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, varying current flowing between the conductor and a point beyond the more remote electrode and adjusting said variable point so that the meter is substantially non-responsive to such current variations, adjusting said variable source of potential to secure substantially zero reading of said meter, and noting the value of the potential of said variable source.

4. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, adjusting said variable source of potential to secure substantially zero reading of said meter, and noting the value of the potential of said variable source.

5. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point of the resistance between the more remote electrode and the conductor, adjusting said variable source of potential to secure substantially zero reading of said meter, and noting the value of the potential of said variable source.

6. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, varying current flowing between the conductor and a point beyond the more remote electrode and adjusting said variable point so that the meter is substantially non-responsive to such current variations, adjusting said variable source of potential to secure substantially zero reading of said meter, and noting the value of the potential of said variable source, and repeating said last mentioned adjustment while causing a different current to flow between the conductor and a point beyond the more remote electrode thereby ascertaining the variation of the last mentioned value of potential with the last mentioned current.

7. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, adjusting said variable source of potential to secure substantially zero reading of said meter, and noting the value of the potential of said variable source, and repeating said last mentioned adjustment while causing a different current to flow between the conductor and a point beyond the more remote electrode thereby ascertaining the variation of the last mentioned value of potential with the last mentioned current.

8. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, varying current flowing between the conductor and a point beyond the more remote electrode and adjusting said variable point so that the meter is substantially non-responsive to such current variations, adjusting said variable source of potential to secure substantially zero reading of said meter, and noting the value of the potential of said variable source, and repeating said last mentioned adjustment while causing a different current to flow between the conductor and a point beyond the more remote electrode thereby ascertaining the variation of the last mentioned value of potential with the last mentioned current.

9. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, adjusting said variable source of potential to secure substantially zero reading of said meter, and noting the value of the potential of said variable source, and repeating said last mentioned adjustment while causing a different current to flow between the conductor and a point beyond the more remote electrode thereby ascertaining the variation of the last mentioned value of potential with the last mentioned current.

10. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point of the resistance between the more remote electrode and the conductor, adjusting said variable source of potential to secure substantially zero reading of said meter, and noting the value of the potential of said variable source, and repeating said last mentioned adjustment while causing a different current to flow between the conductor and a point beyond the more remote electrode thereby ascertaining the variation of the last mentioned value of potential with the last mentioned current.

11. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, said meter having a reading substantially linearly related to its input, varying current flowing between the conductor and a point beyond the more remote electrode and adjusting said variable point so that the meter is substantially non-responsive to such current variations, adjusting said variable source of potential to secure substantially zero reading of said meter, and noting the reading of said meter while causing a different current to flow between the conductor and a point beyond the more remote electrode.

12. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point variable along the resistance between the more remote electrode and the conductor, said meter having a reading substantially linearly related to its input, adjusting said variable source of potential to secure substantially zero reading of said meter, and noting the reading of said meter while causing a different current to flow between the conductor and a point beyond the more remote electrode.

13. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, said meter having a reading substantially linearly related to its input, varying current flowing between the conductor and a point beyond the more remote electrode and adjusting said variable point so that the meter is substantially non-responsive to such current variations, adjusting said variable source of potential to secure substantially zero reading of said meter, and noting the reading of said meter while causing a different current to flow between the conductor and a point beyond the more remote electrode.

14. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, said variable source of potential being between said resistance and the conductor, providing a meter between the nearer electrode and a point variable along the resistance between the more remote electrode and the conductor, said meter having a reading substantially linearly related to its input, adjusting said variable source of potential to secure substantially zero reading of said meter, and noting the reading of said meter while causing a different current to flow between the conductor and a point beyond the more remote electrode.

15. The method of determining average relative potential conditions existing between a conductor in contact with the earth and a region sufficiently remote therefrom that local action current effects are negligible thereat comprising providing a pair of electrodes beyond said region spaced at different distances from the conductor, providing a resistance and a variable source of potential between the conductor and the electrode which is more remote therefrom, providing a meter between the nearer electrode and a point of the resistance between the more remote electrode and the conductor, said meter having a reading substantially linearly related to its input, adjusting said variable source of potential to secure substantially zero reading of said meter, and noting the reading of said meter while causing a different current to flow between the conductor and a point beyond the more remote electrode.

16. The method of ascertaining resistivity conditions in the vicinity of a conductor in contact with the earth comprising providing beyond a region in which local action currents are appreciable a pair of electrodes spaced at different distances from the conductor, providing a resistance and a variable source of potential between the conductor and the electrode which is more remote therefrom, providing a meter between the nearer electrode and a point variable along the resistance between the more remote electrode and the conductor, causing alternating current to flow between the conductor and a point beyond the more remote electrode, adjusting said variable point to secure a zero response of said meter to alternating current, thereupon varying direct current flowing between the conductor and a point beyond the more remote electrodes, and noting the variation of direct current response with said varying direct current.

17. The method of ascertaining resistivity conditions in the vicinity of a conductor in contact with the earth comprising providing beyond a region in which local action currents are appreciable a pair of electrodes spaced at different distances from the conductor, providing a resistance and a variable source of potential between the conductor and the electrode which is more remote therefrom, providing a meter between the nearer electrode and a point variable along the resistance between the more remote electrode and the conductor, causing alternating current to flow between the conductor and a point beyond the more remote electrode, adjusting said variable point to secure a zero response of said meter to alternating current, thereupon varying direct current flowing between the conductor and a point beyond the more remote electrode, and adjusting said variable source of potential to determine the changes therein necessary to maintain the direct current reading of said meter substantially zero with variation of said direct current.

18. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, and a meter between the nearer electrode and a point of said resistance, said variable source of potential being between the resistance and said conductor.

19. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, and a meter between the nearer electrode and a point of said resistance.

20. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, a meter between the nearer electrode and a point of said resistance, and means for causing a current to flow between the conductor and a point beyond the remote electrode.

21. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, a meter between the nearer electrode and a point of said resistance, and means for causing a direct current to flow between the conductor and a point beyond the remote electrode.

22. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, a meter between the nearer electrode and a point of said resistance, and means for causing an alternating current to flow between the conductor and a point beyond the remote electrode.

23. Apparatus for determining electrical conditions existing in the vicinity of a conductor in contact with the earth comprising a pair of electrodes located in contact with the earth at different distances from the conductor beyond a region in which local action currents are appreciable, a resistance and a variable source of potential between the conductor and the electrode which is more remote therefrom, a meter between the nearer electrode and a point of said resistance, and means for causing both direct and alternating currents to flow between the conductor and a point beyond the remote electrode.

JOHN M. PEARSON.